United States Patent [19]
Garcia

[11] Patent Number: 6,099,638
[45] Date of Patent: *Aug. 8, 2000

[54] CEMENT COMPOSITION FOR MODELING

[76] Inventor: Carlos Javier Fernandez Garcia, Sor Juana Ines de la Cruz #25, Barrio Santa Cruz, Tepoztlan, Morelos, Mexico

[*] Notice: This patent issued on a continued prosecution application filed under 37 CFR 1.53(d), and is subject to the twenty year patent term provisions of 35 U.S.C. 154(a)(2).

[21] Appl. No.: 08/650,893

[22] Filed: May 17, 1996

Related U.S. Application Data

[63] Continuation of application No. 08/212,109, Mar. 11, 1994, abandoned.

[30] Foreign Application Priority Data

Mar. 12, 1993 [MX] Mexico .................................. 931379

[51] Int. Cl.[7] ........................... C04B 16/06; C04B 14/06; C04B 14/38
[52] U.S. Cl. ........................ 106/724; 106/708; 106/711; 106/737; 106/790; 106/802; 106/816
[58] Field of Search .................... 106/711, 816, 106/724, 737, 802, 790, 708

[56] References Cited

U.S. PATENT DOCUMENTS

| | | | |
|---|---|---|---|
| 3,965,020 | 6/1976 | Noll et al. ................................ | 252/62 |
| 4,038,094 | 7/1977 | Bondi ...................................... | 106/711 |
| 4,101,335 | 7/1978 | Barrable ................................... | 106/99 |
| 4,166,749 | 9/1979 | Sterrett et al. .......................... | 106/711 |
| 4,229,225 | 10/1980 | Kraszewski et al. ................... | 106/711 |
| 4,306,911 | 12/1981 | Gordon et al. .......................... | 106/644 |
| 4,363,666 | 12/1982 | Johnson et al. ......................... | 106/711 |
| 4,749,431 | 6/1988 | Fassle et al. ............................ | 156/245 |
| 5,298,071 | 3/1994 | Vondran .................................. | 106/757 |

FOREIGN PATENT DOCUMENTS

| | | | |
|---|---|---|---|
| 0103195 | 3/1984 | European Pat. Off. ............... | 106/711 |
| 0203333 | 12/1986 | European Pat. Off. . | |
| 2117753 | 10/1983 | United Kingdom . | |

OTHER PUBLICATIONS

Patent Abstracts of Japan; vol. 014, No. 123 (c–0698), Mar. 8, 1990 and JP–A–01 320241.

Chemical Abstracts, vol. 116, No. 12, Mar. 23, 1992.

*Primary Examiner*—Anthony Green
*Attorney, Agent, or Firm*—Blakely, Sokoloff, Taylor & Zafman LLP

[57] ABSTRACT

This invention relates to a cement or cementitious composition with synthetic or natural fibers and/or microfibers with caliber or gauge smaller than 0.0508 mm (2 mils), in a proportion from 0.2 to 1.5% of total weight of composition when dry. Aggregates and additives that achieve thixotropy, plasticity, which preserve its dimensional structure and integral mechanical bonds may also be included. These above ingredients are included to create a composition suitable for modeling (i.e., a petrified material, cement, mortar, or concrete with extraordinary and novel characteristics). This composition is also useful for constructing, machining, restoring or creating forms with or without structures. Furthermore, the composition solidifies without contractions, fissures or cracks.

14 Claims, No Drawings

CEMENT COMPOSITION FOR MODELING

This is a continuation of application Ser. No. 08/212,109 filed Mar. 11, 1994, now abandoned.

BACKGROUND OF THE INVENTION

Field of the Invention

The purpose of this invention is to provide a novel, practical, economic, non-toxic and durable material, both for the construction industry and for craftsmen and artists and for the industry in general, with which one may model, machine, restore or create forms with the ease of modeling clay and the resistance of concrete.

With regards to the construction field, it may be used without the need of arch centering and in other fields without molds or ovens due to its principal characteristics which are: extraordinary plasticity, conservation of dimensional structure, both when dry and when hardening, and integral mechanical bonds that prevent slumping.

Sculptors have long desired a material with high resistance, suitable for sculpting stone obligues. In the present specification a distinction is made between the concepts of modeling and molding. Modeling relates to forming a material without a mold or arch centering. Molding relates to forming a material with a mold or arch centering.

None of the cements, cementitious materials, mortars and concretes in the prior art, were suitable for modeling while also having the resistance of concrete. Although one could use plasticizers, superplasticizers, gypsums and additives with loads of fine powders, to increase plasticity (i.e., improve the plastic characteristics of mortars), these components do not suppress slumping. Moreover, use of these components increase contractions and diminish the resistance of the material.

SUMMARY OF THE INVENTION

It has been known in the state of the art for thousands of years to use fibers in cementitious materials, always with the sole purpose of reinforcing but never for modeling. The present invention is directed to a composition which uses fibers with a caliper smaller than 0.0508 mm (2 mils) and of microfibers smaller than 0.0254 mm (1 mil). Fibers of such calibers may be included in mortars, cements, cementitious materials, and concrete to create a composition suitable for modeling. Also, modifying the grain size organization provides a novel combination of grading in the aggregates, which produces an extraordinary elasticity, an increase in resistance, and preservation of dimensional structure. In order to further improve this composition, thixotropic agents, selected from microsilica, amorphous silicon dioxide or colloidal silica, may also be included. These types of additives have never been used for the design of established mortars for the purpose of taking advantage of their thixotropic benefit.

DESCRIPTION OF THE PREFERRED EMBODIMENT

Three novel and fundamental parameters, which, even though each one of them renders very good results on a separate basis, together provides a superior composition of this invention, which comprises:
1) Inclusion of fibers and specially of microfibers, both synthetic and natural fibers.
2) Grain size control of the aggregates with new specifications for modeling.
3) Inclusion of thixotropic agents and/or other additives.

1. Inclusion of Fibers and Microfibers

For thousands of years natural fibers such as straw, jute, horse's hair, coconut and bamboo fibers were used for the purpose of reinforcing cementitious materials.

In the last several decades synthetic fibers began to be used to reinforce mortars and concrete. See, for example, ASTM C1116 Fiber-Reinforced Concrete and Shotcrete; ASTM C1154 Asbestos and Fiber Cement; ASTM C1329 Standard Specification for Mortar Cement. Since the fibers were used exclusively for reinforcing, the required caliber of the fibers was greater than 0.0508 mm (2 mils). Alternatively, expensive and/or toxic filaments were used to reinforce. However, the literature has not foreseen in any manner whatsoever that fibers or microfibers may modify and/or improve the hardening properties of the compositions.

Microfibers generate important changes at the level of the structure of the composition integrating it internally to obtain a mechanical bond, which provides the mass with consistency and at the same time with plasticity. Thus microfibers add new physical characteristics in the mass plasticity and mechanical bond, that large caliber fibers could not produce.

Synthetic or natural fibers with caliber smaller than 0.0508 mm when added to the composition in the proportion of 0.2 to 1.5% of total weight of the composition when dry, improves the plasticity and resistance of the material that is suitable for modeling.

2. Grain Size Control

ASTM C33 is the standard specification for concrete aggregates and ASTM C144 is the standard specification for C144 aggregate for masonry mortar, which cites to ASTM C33 for mortar aggregate grading specifications. For ASTM acceptable aggregate, ASTM C33 only requires that the aggregate pass through a No. 4 sieve (4.75-mm) and that only a minimum percentage of the aggregate pass through a No. 200 sieve (75-$\mu$m). For concrete, that minimum percentage is 5% of the total weight of the aggregate and for mortar, that minimum percentage is 10% of the total weight of the aggregate. The rationale behind the upper, No. 4 sieve specification is that larger size aggregate prevents workability whereas the rationale behind the lower, No. 200 sieve specification is that smaller size aggregate are, in general, contaminated with clays and organic materials that, in turn, demand a greater amount of water in the mixture.

In all cases, the required specifications are for the purpose of maintaining the resistances, diminishing the contractions by greater requirement of water and having a product with known specifications of workability for mortars and concretes.

The invented grain size combination has the purpose of providing plasticity to the material by modifying with additives the physical properties of the composition, as opposed to prior materials requiring chemical or physicochemical additives. The present invention the gauges or calibers of the aggregates as a multiple combination of "gears", that is, to stop being aggregates in order to turn, as the fibers and microfibers in bonds interact mechanically in the behaviour of masses. The composition may be improved by the inclusion of thixotropic additives. For example, plasticizers, hardening accelerators, air includers, adhesives, resins, water retainers, superplasticizers and other additives known and utilized by the current state of the art may also be added to the composition to improve its characteristics.

For example, in one embodiment, a composition suitable for modeling, while keeping its dimensional structure in an uncured state and hardened into a cured state without contractions, fissures, or cracks consists of cement in the amount of 5 to 99.8% by weight and/or filler sand in the amount of 20 to 99.8% by weight, together with fibers of polypropylene or nylon in the amount of 0.2 to 1.5% in weight and thixotropic agents in the amount of 0.001 to 5% by weight. Of the 20 to 99.8% by weight of said composition of the filler sand, the combination of 50 parts of sand with a mesh size of 16, 30 parts of sand with a mesh size of 30, 8 parts of sand with a mesh size of 50, 7 parts of sand with a mesh size of 80, 3 parts of sand with a mesh size 120, and 2 parts of sand with mesh size of 200, combined with fibers with a thickness less than 0.0381 mm (1.5 C thousandths of an inch), produces a good result. Similarly, by using 10 to 70% of the cement, 30 to 90% of the filler sand, 0.2 to 8% of a polypropylene microfiber (said microfiber having a diameter less than 0.0254 mm), 0.02 to 0.25% amorphous silicon dioxide, and the following additives (plasticizer additives, air blowing agents, water reducing agents and curing accelerators), a composition with increased plasticity, viscosity elasticity and zero slumping may be produced. One may use this composition and vary the above-mentioned parameters to produce concrete, mortar, and cement products having zero slumping and great workability.

3. Inclusion of Thixotropics

The inclusion of additives such as microsilica, amorphous silicon dioxide, synthetic silica or colloidal silica improves the thixotropy in the material.

These thixotropic agents are used in some paints, inks, the food industry and other industries, but have never been used to provide for mortar consistency.

These three parameters create a structural change in the mass, changing the physical characteristics of the mass. Therefore presenting these qualities of plasticity and resistance so they are clearly integrated, is a concept which not been explored in cement until the present invention. The relationship between the masses with these new qualities presents a new perspective. There are multiple variations upon applying the three fundamental parameters to cements, cementitious materials, mortars and concrete. This is because each one of the three parameters provides good results separately. There are also countless variations as regards their combination and composition as will be seen by the examples. For example, the principle of inclusion of fibers and microfibers renders different benefits both on a plastic and structural level than the principle of grain size control or that of the inclusion of thixotropic agents. Therefore, the combination of the three parameters can be tailored to create different formulations in accordance with the needs of each application.

The present invention provides a material that preserves its dimensional structure once shaped by any of the current processes, before curing, and upon hardening will improve this quality. That is, in cement, a physical change from a semiliquid known material to a new semi-solid material with great workability, was achieved. This was achieved because of the following novel characteristics.

With the composition of the present invention, putties with zero slumping are obtained, and without the need of compression efforts. While having enough amounts of water in the composition to allow one to work with them, the integral mechanic bonds and additives of this composition provide modelability, plasticity, cohesion and firmness characteristics which preserve its dimensional structure. These characteristics have not been obtained on any petrified material in the prior art.

One of the features that holds this invention is that by reducing the caliber of the fibers (i.e., using microfibers), the amount of fibers may be increased, improving the plastic behaviour, mechanical bond and resistances in the composition.

Grain size may be controlled in order to obtain plasticity from greater volumes of thick and intermediate calibers combined to produce a predetermined effect. Specified microsilica and other additives may be included in the composition in order to obtain improved thixotropy and plasticity.

Due to the above, the best mode to obtain this objective is the combination of the above mentioned three parameters which leads to the novel composition of cement for modeling.

EXAMPLES

With the purpose of submitting an analysis of the behaviour of mortars and microconcretes (with grain size control), with inclusion of fibers and microfibers and with thixotropic properties, the following tests were carried out.

In all the examples, the ingredients of the compositions of the present invention were manually mixed together when dry, to obtain a homogeneous mixture. When water is added, the ingredients are thoroughly mixed until a homogeneous slurry is obtained.

Example 1

The ingredients used in this example were 640 gr. of sand, 350 gr. of pozzolanic cement, 10 gr. of microfiber, and 275 ml. of water. This composition showed a considerable increase in its cohesion and viscosity. The excess of fibers and the difficulty of the composition to homogenize were drawbacks of this composition.

Example 2

The ingredients used in this example were 647 gr. of sand, 350 gr. of pozzolanic cement, 3 gr. of microfiber of 0.0127 mm (0.5 mils), and 275 ml of water. This composition showed a slight increase in its cohesion, viscosity and plasticity.

Example 3

The ingredients used in this example were 645 gr of sand, 350 gr. of pozzolanic cement, 5 gr. of typical polypropylene fiber of 0.0635 mm (2.5 mils), and 275 ml of water. This composition showed a very slight increase in its viscosity. The excess of fiber, slight detriment of plasticity, due to its caliber greater than 0.0508 mm and great difficulty of the composition to homogenize were drawbacks of the composition.

Example 4

The ingredients used in this example were 650 gr. of screened sand at screen 16 with controlled grading 350 gr. of pozzolanic cement, and 275 ml. of water. This composition showed a slight increase in viscosity and plasticity.

Example 5

The ingredients used in this example were 600 gr. of sand, 350 gr. of pozzolanic cement 50 gr. of amorphous silicon dioxide 275 ml. of water. This composition showed a noticeable requirement of water, therefore, we added 200 milliliters more than in the other tests. This composition had a considerable increase in viscosity, elasticity and thixotropy.

Example 6

The ingredients used in this example were 650 gr. of screened sand at screen 16, 350 gr. of pozzolanic cement, 475 10 ml. of water; and the result of this example show an extraordinary increase in plasticity, viscosity, zero slumping, elasticity, integral mechanic bonds, thixotropy, preservation of dimensional structure and workability.

The above description and the following claims describe the preferred embodiment of the present invention. Particularly with regard to the claims it must be understood that changes can be carried out without departing from the essential spirit and scope of the present invention. In this regard, it is intended that these changes fall within the scope of the present invention. It is simply not practical to describe and claim all of the possible combinations that may be achieved with the present invention. The various changes and combinations to the submitted claims and of other aspects submitted in the specification are intended to be included within the claims and shall be understood as supported by the existing specification.

The foregoing description of the specific modes reveals the nature of the invention that others may, upon applying this knowledge, easily modify or adapt for various applications by adjusting it to the specific applications. These modalities will not depart from the general concept and therefore will be considered to fall within the meaning and range of equivalents of the described and claimed modalities. It shall also be understood that the wording and technology are submitted for the purpose of describing and not of limiting.

What is claimed is:

1. A modeling composition, comprising, expressed as dry weight:
    a) 5 to 99.8% of a cement;
    b) 20 to 99.8% of a filler sand;
    c) 0.2 to 8% polypropylene microfiber, said microfiber having a diameter less than 0.0254 millimeters;
    d) 0.02 to 0.25% amorphous silicon dioxide; and
    e) suitable amounts of at least one of plasticizer additives, air blowing agents, water reducing agents and curing accelerators to maintain a dimensional structure in an uncured, modeled state and harden into a cured state without contractions, fissures or cracks.

2. A modeling composition, said composition maintaining a dimensional structure in an uncured, modeled state and hardening into a cured state without contractions, fissures or cracks comprising in a dry form:
    a) cement being present in amount of 5 to 99.8% by weight of said composition;
    b) one of natural and synthetic fibers being present in amount of 0.2 to 1.5% in weight of said composition said fibers having a thickness less than 0.0381 mm;
    c) a thixotropic agent selected from the group consisting of microsilica, amorphous silicon dioxide, synthetic silica, and colloidal silica present in amount of 0.001 to 5% by weight of said composition; and
    d) filler sand being present in amount to complete the composition, said filler sand including, by weight of said sand,
        i) 50 parts of sand with a mesh size of 16;
        ii) 30 parts of sand with a mesh size of 30;
        iii) 8 parts of sand with a mesh size of 50;
        iv) 7 parts of sand with a mesh size of 80;
        v) 3 parts of sand with a mesh size of 120;
        vi) 2 parts of sand with a mesh size of 200.

3. A process for preparing a modeling, comprising:
    a) preparing a composition including
        i) sand;
        ii) fiber of 0.2–1.5% by weight of the total composition, said fibers having a caliper smaller than 0.0508 millimeters (2 mils); and
        iii) a thixotropic agent of 0.001–5% by weight of the total composition, and
    b) adding cement of 5–99.8% by weight of the total composition.

4. The process of claim 3, further comprising the step of mixing the composition with a suitable amount of water to yield a composition for modeling.

5. The process of claim 3, wherein the sand is
    50 parts of mesh 16;
    30 parts of mesh 30;
    7 parts of mesh 80;
    3 parts of mesh 120; and
    2 parts of mesh 200.

6. The process of claim 3, wherein the fiber is one of a polypropylene or nylon fiber with a diameter of less than 0.0254 mm.

7. A composition material for modeling, the composition material comprising:
    a modeling material present in an amount that is 10 to 70% by weight of the composition;
    fibers having a caliber smaller than 0.0508 millimeters (2 thousandths of an inch) wherein the fibers are present in an amount that is 0.2 to 8% by weight of the composition so as to form a composition whose dimensional structure is preserved during the curing process without the use of support structures;
    amorphous silicon dioxide present in an amount that is 0.02 to 0.25% by weight of the composition; and
    filler sand having a grain size in accordance with ASTM acceptable aggregate and present in an amount that is 30 to 90% by weight of the composition to complete the composition.

8. The composition material of claim 7 wherein the modeling material is concrete.

9. The composition material of claim 7 wherein the modeling material is mortar.

10. The composition material of claim 7 wherein the modeling material is cement.

11. The composition material of claim 10 wherein the composition material is adapted to maintain a dimensional structure in an uncured, modeled state and to harden into a cured state without contractions, fissures or cracks further comprising to complete the composition, suitable amounts of plasticizer additives, air blowing agents, water reducing agents, and curing accelerators.

12. The composition material of claim 11 further comprising water sufficient to yield a composition for modeling, the filler sand including, by weight of the sand,
    i) 50 parts of sand with a mesh size of 16 (1.18 mm);
    ii) 30 parts of sand with a mesh size of 30 (600 µm);
    iii) 8 parts of sand with a mesh size of 50 (300 µm);
    iv) 7 parts of sand with a mesh size of 80 (225 µm);
    v) 3 parts of sand with a mesh size of 120 (195 µm); and
    vi) 2 parts of sand with a mesh size of 200 (75 µm).

13. A process for preparing a modeling composition comprising:
    a) preparing a composition including
        i) sand, wherein the sand is 50 parts of mesh 16 (1.18 mm),
30 parts of mesh 30 (600 μm),
8 parts of mesh 50 (300 μm),
7 parts of mesh 80 (225 μm),
3 parts of mesh 120 (195 μm), and
2 parts of mesh 200 (75 μm), ii) polypropylene or nylon fiber of 0.2–8% by weight of the total composition, each fiber having a diameter of less than 0.0254 mm; and iii) amorphous silicon dioxide present in amount of 0.02 to 0.25% by weight of the total composition, and b) adding cement of 10 to 70% by weight of the total composition.

14. The process of claim 13 further comprising the step of c) mixing the composition with a suitable amount of water to yield a composition for modeling.

* * * * *

UNITED STATES PATENT AND TRADEMARK OFFICE
CERTIFICATE OF CORRECTION

PATENT NO. : 6,099,638
DATED : August 8, 2000
INVENTOR(S) : Garcia

It is certified that error appears in the above-identified patent and that said Letters Patent is hereby corrected as shown below:

Column 6,
Line 1, after "modeling" insert -- composition --.

Signed and Sealed this

Seventh Day of May, 2002

Attest:

JAMES E. ROGAN
*Attesting Officer*     *Director of the United States Patent and Trademark Office*